US008523141B2

(12) United States Patent
Elliott et al.

(10) Patent No.: US 8,523,141 B2
(45) Date of Patent: Sep. 3, 2013

(54) CONTROL VALVE (75) Inventors: Declan Elliott, Longford County (IE); Andrew Grace, County Clare (IE); Edmund McHugh, County Longford (IE); Martin O'Donnell, County Donegal (IE)

(73) Assignee: Cameron International Corporation, Houston, TX (US)

( * ) Notice: Subject to any disclaimer, the term of this patent is extended or adjusted under 35 U.S.C. 154(b) by 342 days.

(21) Appl. No.: 12/934,065

(22) PCT Filed: Apr. 18, 2009

(86) PCT No.: PCT/IB2009/051611
§ 371 (c)(1),
(2), (4) Date: Sep. 22, 2010

(87) PCT Pub. No.: WO2009/130652
PCT Pub. Date: Oct. 29, 2009

(65) Prior Publication Data
US 2011/0042592 A1 Feb. 24, 2011

Related U.S. Application Data (60) Provisional application No. 61/047,747, filed on Apr. 24, 2008.

(51) Int. Cl.
*F16K 47/08* (2006.01)
(52) U.S. Cl.
USPC ............................................ 251/127; 251/326

(58) Field of Classification Search
USPC ........ 138/43, 45, 46; 251/118, 127, 326–329
See application file for complete search history.

(56) References Cited

U.S. PATENT DOCUMENTS

| | | | | |
|---|---|---|---|---|
| 2,601,231 A | * | 6/1952 | Smith et al. | 137/625.33 |
| 3,380,709 A | * | 4/1968 | Scaramucci | 251/172 |
| 3,514,074 A | * | 5/1970 | Self | 251/127 |
| 3,743,238 A | * | 7/1973 | Watts | 251/118 |
| 3,856,049 A | * | 12/1974 | Scull | 138/42 |
| 4,226,368 A | * | 10/1980 | Hunter | 138/42 |
| 4,295,493 A | * | 10/1981 | Bey | 138/43 |
| 4,567,915 A | * | 2/1986 | Bates et al. | 138/42 |
| 4,674,537 A | * | 6/1987 | Bergmann | 137/625.31 |
| 4,691,894 A | * | 9/1987 | Pyotsia et al. | 251/127 |

(Continued)

FOREIGN PATENT DOCUMENTS

| DE | 1261712 | 2/1968 |
|---|---|---|
| DE | 19841215 | 4/2000 |

(Continued)

OTHER PUBLICATIONS

In-Line Chokes, Cameron: Willis Products; Cooper Cameron Corporation; 1995.
International Search Report & Written Opinion of PCT/IB2009/051611 dated Sep. 3, 2009.

*Primary Examiner* — John Bastianelli
(74) *Attorney, Agent, or Firm* — Fletcher Yoder, P.C.

(57) ABSTRACT

Provided is a valve, including an in-line flow passage, a shut-off mechanism, and a multi-stage throttling section disposed in the in-line flow passage. Further provided is an in-line valve, including a flow control component and a sealing component, wherein the flow control component and the sealing component are separate from one another.

25 Claims, 8 Drawing Sheets

(56) References Cited

U.S. PATENT DOCUMENTS

| | | | | |
|---|---|---|---|---|
| 5,327,941 A | * | 7/1994 | Bitsakis et al. | 138/42 |
| 5,482,249 A | * | 1/1996 | Schafbuch et al. | 251/118 |
| 5,732,738 A | * | 3/1998 | Graham | 137/625.33 |
| 5,762,107 A | * | 6/1998 | Laws | 138/44 |
| 5,772,178 A | * | 6/1998 | Bey | 251/127 |

FOREIGN PATENT DOCUMENTS

| | | |
|---|---|---|
| GB | DE1094538 | 12/1960 |
| GB | 1512072 | 5/1978 |
| WO | WO2004106792 | 12/2004 |
| WO | WO2005103542 | 11/2005 |

* cited by examiner

CONTROL VALVE

CROSS-REFERENCE TO RELATED APPLICATIONS

This application claims priority to PCT Application No. PCT/IB2009/051611 entitled "Control Valve", filed on Apr. 18, 2009, which is herein incorporated by reference in its entirety, and which claims priority to U.S. Provisional Patent Application No. 61/047,747, entitled "Control Valve", filed on Apr. 24, 2008, which is herein incorporated by reference in its entirety.

FIELD OF THE INVENTION

This invention relates to flow control systems. More particularly, the present invention, in accordance with certain embodiments, relates to a valve for use with various flow control systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a variety of fluid handling systems, the flow of a fluid is controlled by a valve. These fluid handling systems may be employed in any variety of applications and industries, such as oil and gas systems, storage facilities, manufacturing facilities, refineries, water treatment facilities, industrial plants, and the like. For example, in the production of oil and natural gas, valves are employed to direct and regulate the flow of fluids (e.g., gas, water, and oil) in pipes, wells, pumps, vessels, and refineries. Valves generally include an open position that enables fluid flow and a closed position that reduces or completely shuts-off the fluid flow. Valves are also employed to limit (e.g., throttle) the pressure and flow rate of the fluid flowing through the valve. For example, the valve may be partially closed to partially obstruct the fluid flow, or may include an occlusion that obstructs the fluid flow. Throttling is particularly useful where fluid flow occurs at a high rate and/or pressure and it is desirable to reduce the flow rate and/or pressure. Throttling may be particularly well suited to direct fluid flow from oil and gas wells where the pressure of the fluids being expelled from the mineral reservoir may exceed 3,000 pounds per square inch (psi), for instance.

Two exemplary types of valves include gate valves and control valves. Gate valves typically include a moveable gate, static seat rings that seal against the gate, and a housing in which the gate and seat rings are disposed. Generally, the gate includes two-opposing faces that contact seat rings, and the gate includes a flow bore extending between the faces. The flow bore is slid into alignment with the seat rings to enable flow through the valve, and the flow bore is slid out of alignment with the seat rings to restrict the flow. As the gate moves from a sealed position to an unsealed position, it slides along a generally straight line between the seat rings, which are typically affixed to the housing. Control valves (e.g., choke valves) typically include a valve that displaces a solid cylinder (e.g., a "plug" or "stem") that is placed around or inside a second cylinder or bore. The valve restricts fluid flow based on the cylinder's position relative to the second cylinder or bore. One advantage of choke valves is their ability to partially occlude flow with linear variations in the flow rate. Although the above discussion relates to a few exemplary types of gate and control valves, a variety of other types exists.

Due to the high flow rates, high pressures, and the abrasive nature of certain fluids, various components of typical valve assemblies, such as the seat, guard plates and the sealing elements themselves, may experience extensive wear, which can result in premature failure of the valve assembly. To mitigate the likelihood of such failure, a valve may need to be refurbished, such as through replacement of the internal components (e.g., seats and gates), or replaced entirely. Of course, such refurbishment or replacement may be time-consuming and/or costly, and generally results in downtime for a system.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
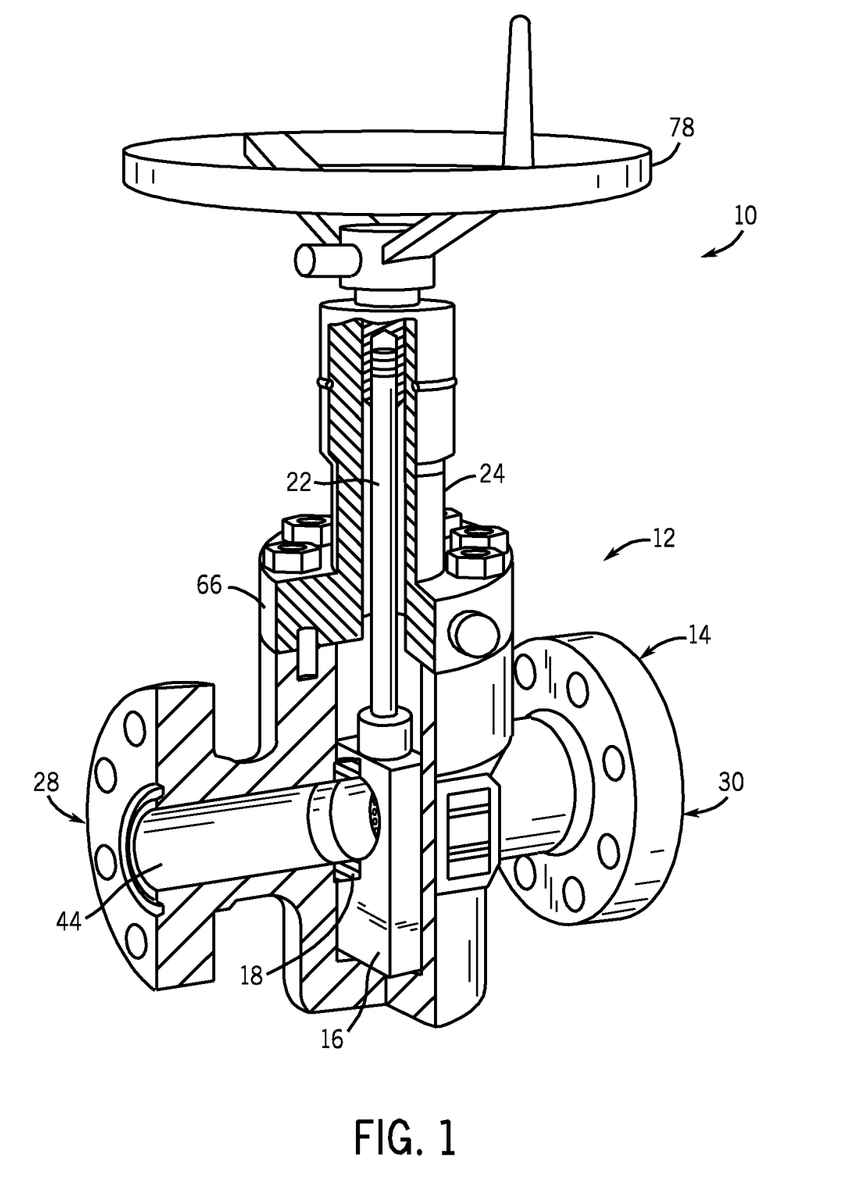
FIG. 1 is a perspective view of a valve in accordance with embodiments of the present technique.
Figure 2:
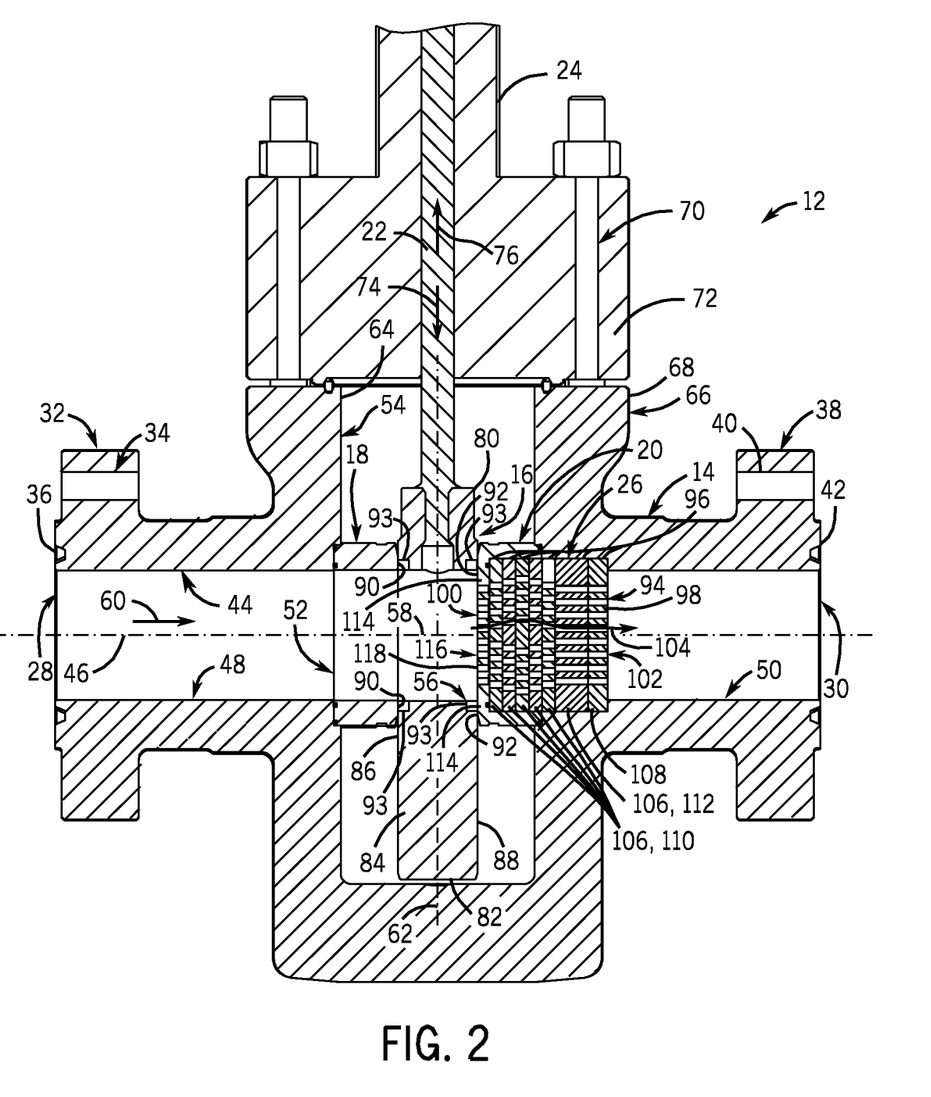
FIG. 2 is a cross-sectioned side view of one embodiment of the valve of FIG. 1 in an open position.
Figure 3:
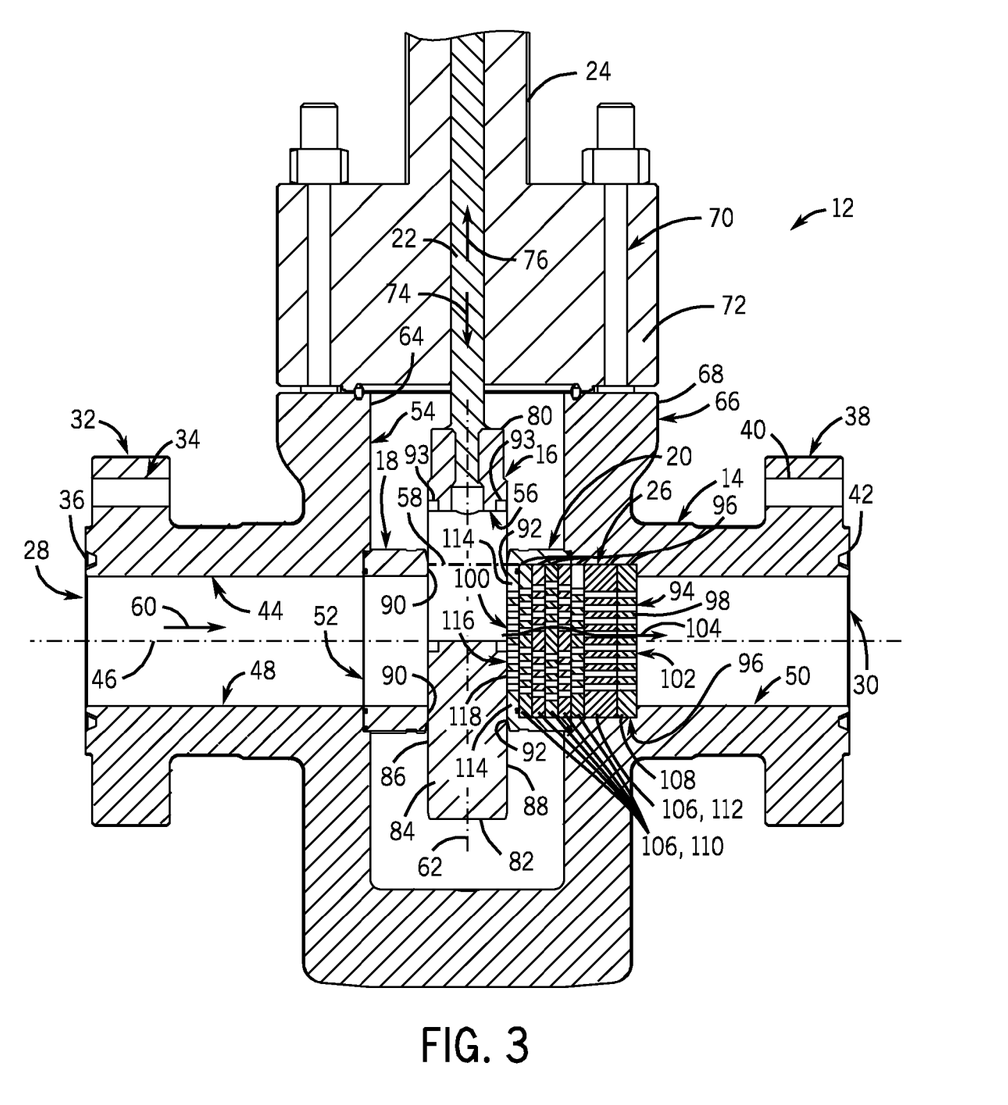
FIG. 3 is a cross-sectional side view of one embodiment the valve of FIG. 1 in a partially closed position.

Referring now to FIGS. 1, 2, and 3, a valve system 10 includes a valve 12 having a body 14, a gate 16, a first seat ring 18, a second seat ring 20, a stem 22, a control 24, and a throttling section 26 in an axial slab (e.g., in-line) valve configuration. As is discussed in further detail below, the throttling section 26 includes multiple interchangeable discs that help to reduce the likelihood that the throttling section will crack and flow downstream. The interchangeable nature of the discs also facilitates simplified installation and maintenance of the throttling section 26.

In the illustrated embodiment, the body 14 includes an inlet 28 and an outlet 30. The inlet 28 is adapted to connect to a fluid source via a first flange 32. In the illustrated embodiment, the first flange 32 includes a plurality of boltholes 34 that facilitate coupling the first flange 32 to a pipe or other fluid source. The first flange 32 also includes a sealing region 36 having a raised surface and a recessed region (e.g., annular recess) for placement of a gasket or seal (e.g., annular seal). The gasket or seal may provide a fluid seal between the valve 12 and the fluid source, for instance. The outlet 30 includes a second flange 38. Similar to the first flange 32, the second flange 38 includes bolt holes 40 that facilitate coupling the second flange 38 to a pipe or other fluid destination, and a sealing region 42 having a raised surface and a recessed region (e.g., annular recess) for placement of a gasket or seal (e.g., annular seal). The inlet and outlet flange may have identical profiles (e.g., bolting profiles) or have varied profiles with respect to one another.

The body 14 also includes a primary passage 44. The primary passage 44 defines an in-line (e.g., straight) bore that runs from the inlet 28 to the outlet 30. For example, in the illustrated embodiment, the primary passage 44 passes through the length of the body 14 along a primary axis 46. Further, in the illustrated embodiment, the passage 44 is formed from a first passage portion 48, a second passage portion 50, and a lateral passage portion 52.

The lateral passage portion 52 includes a portion of the primary passage 44 that is intersected by a lateral passage 54. The lateral passage portion 52 includes passages through the first seat ring 18, the second seat ring 20, and a gate flow bore 56, for instance. The passage 44 may be fully opened, fully closed, or partially opened or closed in any position between the fully opened and fully closed positions depending on the position of the gate 16. For example, FIG. 2 illustrates an embodiment wherein the gate 16 is in the fully opened position. In other words, an axis 58 of the gate flow bore 16 is aligned with the primary axis 46, such that fluid may flow along a path parallel to the primary axis 46 in the direction of arrow 60. In the fully closed position, the gate 16 is positioned such that it completely occludes flow in the passage 44 (e.g., the gate flow bore 16 is completely offset from the passage 44). FIG. 3 illustrates an embodiment of the valve 12 wherein the gate 16 is in a partially opened/closed position. In other words, the gate 16 is displaced along a lateral axis 62 such that the axis 58 of the gate flow bore 56 is not aligned with the primary axis 46, and the gate at least partially occludes the lateral passage 52 and the primary passage 44. In a partially opened/closed position, the gate 16 may be disposed anywhere between the fully opened (FIG. 2) and fully closed position such that only a portion of the primary passage 44 is occluded, thus enabling relatively precise control of flow through the valve. In other embodiments, the gate 16 may include a positive beem device. In such an embodiment, the gate 16 does not have a shut-off or fully closed position. In some embodiments where the gate 16 is a positive beem device, the gate 16 is disposed in only a single position and is generally not movable/adjustable between multiple positions.

The lateral passage 54 includes a bore 64 that is coaxial with the lateral axis 62. In the illustrated embodiment, the lateral passage 54 intersects the primary passage 44 at approximately a right angle (e.g., the lateral axis 62 and the primary axis 46 are orthogonal). Further, in the embodiment shown, the lateral passage 54 is formed in the body 14 of the valve 12, and through a bonnet 66 of the body 14. The lateral passage 54 provides a region that enables movement of the gate 16 between the opened and closed positions, as well as enabling access to the internals (e.g., the first seat ring 18, the second seat ring 20, and the throttling section 26) of the valve 12.

The bonnet 66 includes a portion of the body 14 that enables connection to the control 24. For example, the bonnet 66 includes a bonnet flange 68 that enables coupling of the control 24 to the valve 12. In the embodiment shown, the bonnet flange 68 includes bolts 70 that couple the control 24 to the body 14, and a sealing region 72 having a flat surface and a recessed region for placement of a gasket or seal.

The control 24 enables movement of the gate 16 between the opened and closed positions. In the embodiment shown, the control 24 includes a mechanical device that is coupled to the gate 16 via the stem 22. Operating the control 24 provides movement of the gate 16. For example, the control 24 provides a force in the direction of a first arrow 74 on the stem 22 that urges the gate 16 to the open position (e.g., to open the valve 12), or provides a force in the direction of a second arrow 76 on the stem 22 that urges the gate 16 into the closed position (e.g., to close the valve 12). In the illustrated embodiment, the control 24 includes a wheel 78 that can be rotated in one direction to open the valve 12, or rotated in a second direction to close the valve 12. In other words, rotating the wheel 78 may cause the stem 22 and the gate 16 to move along the lateral axis 62 to open or close the valve 12. Other embodiments of the control 24 may include manual or automatically driven actuators that provide a force to open or close the valve 12. For example, a motor or hydraulic actuator may be used to rotate the wheel 78, or to displace the stem 22 and the gate 16 along the lateral axis 62. Although the previously discussed embodiments include the gate 16 moving along the lateral axis 62, other embodiment may include various configurations of the gate 16. For example, some embodiments may include the gate 16 rotated about the lateral axis 62 to open or close the valve 12. For example, in one embodiment, the gate 16 may include a ball-type valve (e.g., rotary slab/disc gate valve, motor-operated valve (MOV) disc, globe valve, etc.) that is rotated to align or occlude one or more passages through the valve 12.

In the illustrated embodiment, the control 24 includes a single stem 22 that is coupled to the gate 16. In another embodiment, the control 24 may include a stem 22 on both ends of the gate 16 (e.g., two stems). In such an embodiment, the pressure balanced design provides for an equivalent surface area subject to pressure on a top surface 80 and a bottom surface 82 of the gate 16. Accordingly, opening and closing the gate 16 may be simplified due to the absence of a pressure differential on the top surface 80 and the bottom surface 82 of the gate 16. In other words, if the top surface 80 is intersected by the stem 22, fluid surrounding the gate 16 may not exert a fluid pressure over the area of the top surface 80 occupied by the stem 22. However, if the bottom surface 82 of the gate 16 does not include a stem 22, the fluid pressure may act on the entire bottom surface 82 of the gate 16, thus exerting a higher pressure on the bottom surface 82 of the gate 16 than the force exerted on the top surface 80 of the gate 16. This creates more resistance to movement of the gate 16 along the lateral axis 62 in the direction of arrow 74 (e.g., moving from closed to the open position). Although this may not be significant at lower fluid pressures, at high fluid pressures, the difference in the force exerted on the top surface 80 and the bottom surface 82 may be significant. In the embodiment having two stems 22, a similar area on the top surface 80 and the bottom surface 82 of the gate is exposed to approximately the same pressure, giving a balance of pressure acting on the top surface 80 and the bottom surface 82 such that movement in one direction (e.g., arrow 76 or arrow 74) along the lateral axis 62 does not require significantly more or less force than the opposite direction.

The gate 16 includes a slab 84 having the flow bore 56. As discussed previously, the flow bore 56 includes a passage through the slab 84 to enable fluid to pass when the gate 16 is disposed in an open or partially opened/closed position. The flow bore 56 has a shape (e.g., diameter) that is approximately the same as the other portions of the primary passage 44 (e.g., the first passage portion 48 and the second passage portion 50). The gate 16 includes a first gate face 86 and a second gate face 88. The first gate face 86 includes a generally flat surface of the slab 84 that seals against a first seat face 90 of the first seat ring 18. The first seat face 90 contacts the first gate face 86 to provide a fluid seal and discourage fluids from entering the lateral passage 54. In other words, the fluid seal blocks fluid from leaking from the primary passage 44. Similarly, the second gate face 88 includes a generally flat surface on the opposite side of the gate 16 than the first gate face 86, and seals against a second seat face 92 of the second seat ring 20. With the valve 12 in the open position, the second gate face 88 contacts the second seat face 92 to provide a fluid seal that discourages fluids from entering the lateral passage 54.

It is noted that in the open position, the lower portion of the first seat face 86 second seat face 88 are offset from the primary passage 44 and are disposed in a lower portion of the lateral passage 54 that does not directly receive fluid or gas flow. In other words, fluid may enter the lateral passage 44, but does so at a significantly lower velocity than the flow in the primary passage 44 and is potentially static. The reduced fluid flow proximate the lower portion of the first seat face 86 and the second seat face 88 in the open position reduces the potential for wear and/or erosion of these faces. This may be beneficial because, when the gate 16 is moved into the closed position, the lower portion of the first seat face 86 and the second seat face 88 may seal completely against the complementary seat faces of the first seat ring 18 and the second sealing ring 20 due to the lack of erosion and/or wear on the sealing faces. Thus, the potential for leaks in the closed position is reduced, and a complete shut-off may be achieved even after prolonged fluid flow through the valve 12. Such an advantage may be possible due to the separation of a fluid control mechanism (e.g., the throttling section 26) and a shut-off device (e.g., the gate 16), wherein the control mechanism remains in the fluid flow path in the open position and the sealing regions of the shut-off device are offset from direct fluid flow in the open position.

In the closed position, the force of the fluid entering at the inlet 28 and acting against the first gate face 86 of the gate 16 provides additional contact forces between the second gate face 88 and the second seat face 92 to ensure an effective fluid seal (e.g., a metal backseat) that blocks fluid from flowing into the second passage portion 50. In other words, the gate 16 blocks fluid flow, and the interface between the second gate face 88 and the second seat face 92 further blocks fluid from leaking past the valve 12.

Further, the connection between the stem 22 and the gate 16 includes a floating adjustable control mechanism to facilitate the metal backseat. For example, the connection between the stem 22 and the gate 16 may include additional tolerances than enable the gate 16 to shift along the axis 46 to ensure contact between the second face 88 and the second seat face 92. In other words, the gate 16 is configured to float along the axis 46, as opposed to bend along the axis 62, when fluid pressure is exerted against the gate 16 when the valve 12 is in the closed position, thus maintaining contact and an effective fluid seal.

The first gate face 86 and second gate face 88 generally include a hard surface that is conducive to sealing. The hard material may also be resistant to abrasive fluids, thus preventing premature wear of the first gate face 86 and the second gate face 88 due to the fluid flowing over the first gate face 86 and the second gate face 88. Accordingly, one embodiment includes forming the gate 16 from a hard material, such as stellite or tungsten carbide. Similarly an embodiment may include forming the gate 16 from a first material and coating surfaces of the gate 16 in tungsten carbide or a material subjected to an alternative hardening process. In one embodiment, portions of the gate 16 may be coated from differing materials to provide an effective seal in a desired location. Complementary to the gate 16, the first seat ring 18 and the second seat ring 20 may be formed from a material, similar to or different than the material used to form and/or coat the gate 16, that improves resistance to wear and is conducive to sealing. For example, the first seat ring 18 and/or the second seat ring 20 may be formed from stellite or tungsten carbide, and/or coated with tungsten carbide. In some embodiments, at least a portion of the flow paths in the gate 16, the first seat ring 18, and/or the second seat ring 20 are formed from a hard material and/or coated with a hard material, such as stellite or tungsten carbide, and/or subjected to a hardening process. For example, in one embodiment, the internal surface of the gate 16, the first seat ring 18, and/or the second seat ring 20 are formed from a hard material. In another embodiment, only portions that may be subjected to accelerated wear are formed or coated with a hard material. For example, the leading edges (e.g., lip) of the gate 16, the first seat ring 18, and or the second seat ring 20. In another embodiment, the sealing portions of the faces include, a circular ring 93 including a hard material that is disposed in one, or both, of the first gate face 86 and/or the second gate face 88 of the gate 16. The rings 93, in the illustrated embodiment, include a circular shape concentric to the flow bore 56 are complementary to the sealing regions of the first seat ring 18 and the second seat ring 20 when the gate 16 is in the fully closed position.

Further, the gate 16 is generally symmetrical about the lateral axis 62. Thus, the gate 16 may be reversed in position if desired. For example, if the first face 86 of the gate 16 becomes worn (e.g. eroded), the gate 16 may be rotated 180 degrees about the lateral axis 62 such that the first face 86 can contact the second seat face 92, and the second face 88 contacts the first seat face 90 and is exposed to the fluid flowing into the inlet 28 when the valve 12 is in the closed position. For example, the control 24 may be removed from the bonnet 66, the stem 22 and the gate 16 extracted, the stem 22 and/or the gate 16 rotated, the gate 16 and the stem 22 replaced into the lateral passage 54, and the control reassembled to the bonnet 66.

The valve 12 also includes the throttling section 26 disposed in the passage 44. As discussed previously, throttling generally includes reducing the flow rate and/or pressure of the fluid flow. Accordingly, the throttling section 26 is employed to reduce the flow rate and/or pressure of the fluid flowing through the valve 12. In other words, even with the valve 12 in the fully open position, the fluid may not flow freely between the inlet 28 and the outlet 30, but may be exposed to an occlusion (e.g., the throttling section 26) that restricts the free flow of the fluid through the primary passage 44.

In the illustrated embodiment, the throttling section 26 includes a mechanism that reduces the cross-sectional area available for the fluid to pass through the primary passage 44. For example, the throttling section 26 includes a plurality of passages 94 that have a combined cross-sectional area that is less than the cross-sectional area of the passage 44, (e.g., the first passage portion 48, the second passage portion 50, and/or the lateral passage portion 52). Accordingly, the fluid flowing through the each of the plurality of passages 94 is restricted to provide a flow at the outlet 30 that is equal to or less than the flow rate and/or the fluid pressure at the inlet 28. In operation, the throttling section 26 may reduce jets of fluid flow downstream, thereby reducing erosion of the interior surfaces of the valve 12 and associated piping.

The throttling section 26 includes a plurality of throttling discs 96 that are disposed in the primary passage 44. Specifically, in the illustrated embodiment, the throttling section 26 includes the throttling discs 96 disposed partially in the lateral passage 52 and partially in the second passage portion 50. The throttling discs 96 are retained in position by the second seat ring 20. As is discussed in further detail below, the second seat ring 20 can also include throttling features, such as additional passages.

Figure 4:
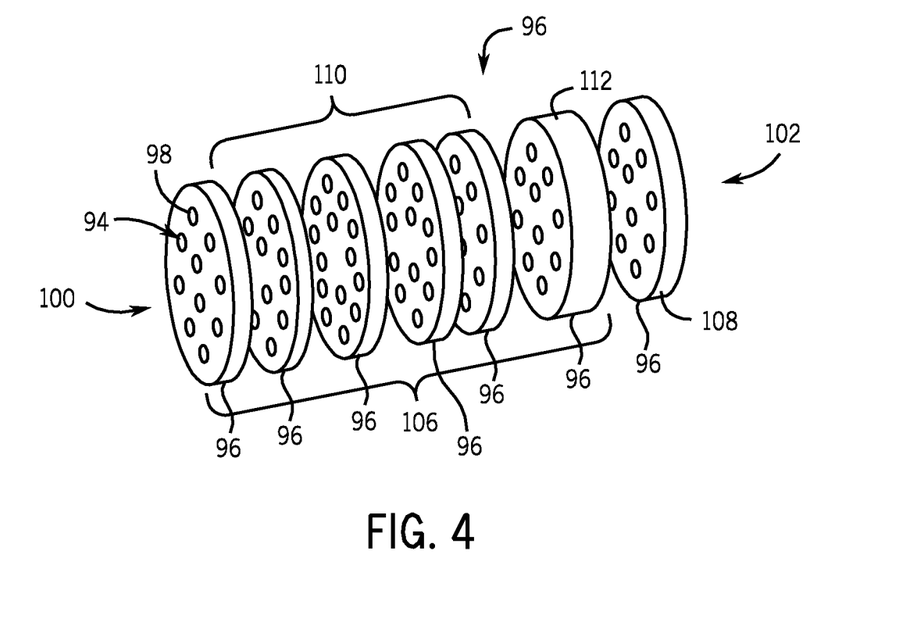
FIG. 4 is an exploded perspective view of one embodiment of throttling discs of the valve of FIG. 1.

FIG. 4 illustrates a detailed exploded view of an exemplary embodiment of the throttling discs 96. In the illustrated embodiment, the plurality of throttling discs 96 is arranged in series. Each of the throttling discs 96 includes a plurality of ports 98 that extend through each of the throttling discs 96. When arranged in series (e.g., stacked side-by-side) the ports 98 of each of the discs 96 at least partially align and partially misalign to form the passages 94 that provide a plurality of flow paths from a throttling inlet 100 of the throttling section 26 to a throttling outlet 102 of the throttling section 26. An example of a flow path is illustrated by a flow path 104 (see FIGS. 2-3). Embodiments may include any number of ports 98 and flow paths 104 to provide a desired drop in flowrate and pressure. For example, the number of ports 98 and flow paths 104 may be reduced to increase the drop in pressure and/or increase the drop in flow rate. In another embodiment, the number of ports 98 and flow paths 104 may be increased to reduce the drop in pressure and/or reduce the drop in flow rate. Further, the flow paths 104 may be defined by holes, slots, or a combination of holes and slots that form one or more of the ports 98. The throttling section 26 includes a multi-stage pressure reduction in some embodiments. In such an embodiment, the throttling section 26 may be referred to as a multi-stage trim. For example, the ports 98 of the throttling section 26, in one embodiment, include restrictions and recovery zones that provide for multi-stage pressure reduction and/or provide a phased pressure drop across the throttling sections.

In some embodiments, the throttling section 26 may include one or more features that are disclosed in U.S. Provisional Patent Application No. 60/969,398, filed on Aug. 31, 2007, and entitled "Multi-Stage Trim," which is herein incorporated by reference in its entirety. For example, the throttling section 26 may include one or more features, such as varying level of restriction via flow path alignment, and various combinations of holes and slots forming the a series of stages or constricted passages in the flow paths 104.

In another embodiment, each of the ports 98 of each of the throttling discs 96 may be aligned in series to provide an in-line (e.g., straight-line) flow path through the throttling section 26. For example, each of the flow paths 104 may include a passage through the ports 98 in each of the throttling discs 96 that are aligned in series and about a single axis. In other words, each of the ports 98 are generally aligned relative to complementary ports 98 on the other throttling discs 96. In another embodiment, the throttling discs 96 may include any combination of aligned and unaligned paths to provide a desired drop in fluid pressure and/or drop in fluid flow rate. For example, one or more of the flow paths 104 may include an in-line (e.g., straight-line) flow path, whereas other ports may include offsets between each of the complementary ports 98 of the throttling discs 96 such that the flow path 104 is irregular (e.g., not an in-line flow path).

Further, the number of throttling disc 96 may be varied to provide the desired drop in fluid pressure and/or drop in fluid flow rate. In the illustrated embodiment, seven throttling discs 96 are arranged in series. Specifically, the throttling discs 96 including six first throttling discs 106 and a single retaining throttling disc 108. The first throttling discs 106 include five single-width discs 110 and a double-width disc 112. In the illustrated embodiment, the double width disc 112 is generally downstream of the five single-width disc 110. However, in other embodiments, any number, type, or order of the throttling discs 96 may be employed to provide a desired pressure drop. For example, the first throttling discs 106 may include a single disc in place of the first throttling discs 106. In another embodiment, a single throttling disc may be used in place of the plurality of throttling discs 96, including the retaining throttling disc 108.

In one embodiment, the throttling discs 96 are formed from a similar material. For example, the first throttling discs 106 and the retaining throttling disc 108 may be formed from a similar metal (e.g., steel or tungsten carbide), ceramic, composite, or the like. Further, each of the throttling discs 96 may include a similar coating of material. In one embodiment, each of the throttling discs 96 includes the same or a similar ceramic or stellite coating, for instance.

In another embodiment, at least one of the throttling discs 96 may be formed from a different material than the other throttling discs 96. In one embodiment, the retaining throttling disc 108 is formed from a different material than the first throttling discs 106. For example, the retaining throttling disc 108 may be formed from a first material that is relatively ductile, and the first throttling discs 106 may be formed from a second material that is not as ductile at the first material. In one embodiment, the retaining throttling disc 108 is formed from a stainless steel and the first throttling discs 106 are formed from a less ductile material, such as tungsten carbide, ceramics, and the like. In another embodiment, the retaining throttling disc 108 is formed from carbon steel, and the first throttling discs 106 are formed from a less ductile material.

The retaining throttling disc 108 being formed from a relatively ductile material may be particularly well suited for preventing failure of the throttling section 26 and/or simplifies maintenance of the valve 12 and the throttling section 26. In certain fluid applications, it may be desired that at least a portion of the throttling discs 96 are formed from or coated with a hard material that is resistant to wear caused by the flow of abrasive fluids across the throttling discs 96. Although hard materials may have high wear resistance, they may be susceptible to cracking due to their low ductility. Over time, the throttling discs 96 may become brittle or cracked, causing portions or all of the throttling discs 96 to be swept into the fluid flowing through the valve 12. As a result, the throttling discs 96 may contaminate the fluid stream, becoming lodged in downstream portions of the fluid system, and the like. Further, the absence of, or cracking of, a portion of the throttling discs 96 may reduce the throttling effect, and provide an undesirable fluid flow rate and pressure drop through the valve 12. As mentioned above, the addition of the retaining throttling disc 108 may prevent or at least reduce the possibility of failure of the throttling discs 96. For example, where the throttling discs 96 are exposed to a sudden shock (e.g., due to impact or vibration), the ductile nature of the retaining disc 108 may provide support of the first throttling disc 106 while providing greater resistance to cracking of the disc 108. Further, even if the first throttling discs 106 crack and portions of the throttling discs 96 enter the fluid flow, the retaining throttling disc 108 may retain (e.g., catch) the portions of the first throttling discs 106 and block them from migrating further down the fluid flow path. In other words, the retaining throttling disc 108 may act as a support for the first throttling disc 106 and/or act as a filter that catches portions of the throttling discs 96 that may otherwise migrate into the fluid stream.

In one embodiment, the holes in the retaining throttling disc 108 (e.g., the holes forming at least a portion of the ports 98 and the flow paths 104) are larger than the complementary holes of the first throttling disc 106 (e.g., the double width-disc 112). In such an embodiment, the larger holes may reduce the throttling effect of the retaining throttling disc 108, thereby, enabling use of the retaining throttling disc 108 with multiple configurations of the first throttling disc 106. In some embodiments, all of the holes are larger, while other embodiments may include any combination of holes that are larger or smaller than the complementary ports 98.

The second seat ring 20 may also provide retention of the throttling discs 96. Returning now to FIGS. 1-2, in the illustrated embodiment, the second seat ring 20 includes a retaining lip 114. The retaining lip 114 includes a portion of the second seat ring 20 that is small enough in diameter to block the throttling discs 96 from moving axially and becoming dislodged from the throttling section 26. For example, in the illustrated embodiment, a cross-section of the second seat ring 20 includes a generally L shaped profile, wherein the lower portion (e.g., the retaining lip 114) of the L may catch the outer diameter of at least one of the throttling discs 96 to provide an axial force that seats the throttling discs 96.

Further, in the illustrated embodiment, the second seat ring 20 includes a throttling portion 116. The throttling portion 116 includes a plurality of ports 118 that at least partially align with the plurality of ports 98 of the throttling section 26. Accordingly, the throttling portion 116 of the second seat ring 20 works in cooperation with the throttling discs 96 to provide the desired drop in pressure and/or flow rate. In another embodiment, the second seat ring 20 does not include the throttling portion 116. Instead, the second seat ring 20 may include a generally open area proximate the primary axis 46. Thus, throttling may not be provided by the second seat ring 20.

Figure 5:
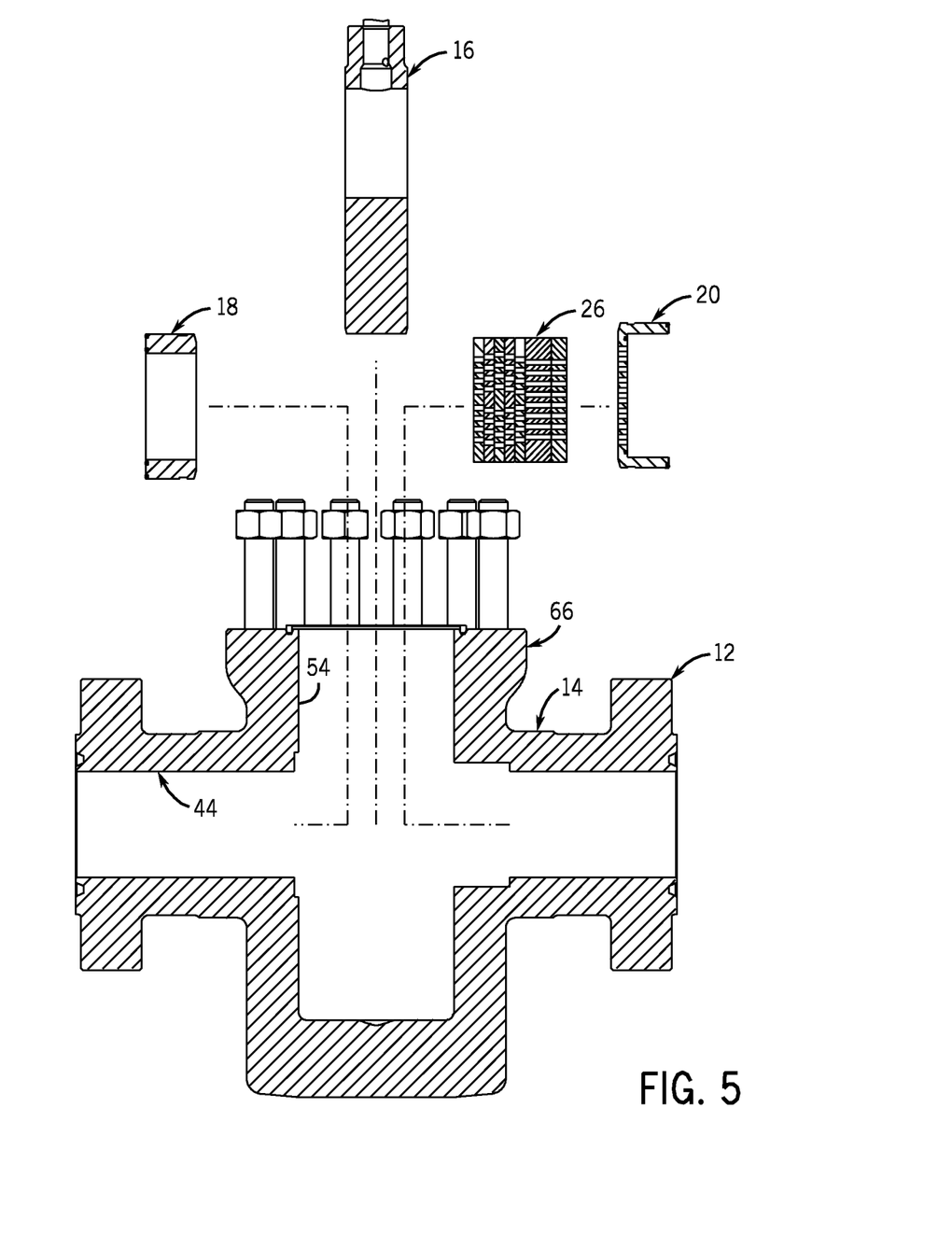
FIG. 5 is a cross-sectioned and exploded side view of the valve of FIG. 1.

The throttling discs 96 may be serviced and/or replaced via the lateral passage 54. As illustrated in FIG. 5, the control 24 may be unbolted from the bonnet 66, the stem 22 removed via the lateral passage 54, the gate 16 removed via the lateral passage 54, the second seat ring 20 removed via the lateral passage 54, and the throttling discs 96 removed via the lateral passage 54. Similarly, the throttling discs 96 may be installed in the reverse order. During installation, the interchangeable nature of the throttling disc 96 enable replacement of a single throttling disc 96, replacements of more than one throttling disc 96, the rearrangement of the throttling disc 96, and the like. Accordingly, the throttling discs 96, and the second seat ring 20 may be serviced and/or replaced without uncoupling the valve at the inlet 28 or the outlet 30. In other words, the first flange 32 and the second flange 38 may remain coupled to their respective connections (e.g., pipelines) while the throttling section 26 is disassembled and/or serviced. This may prove advantageous in applications where in is difficult, costly, or impractical to disconnect the valve 12 at the inlet 28 and/or the outlet 30.

The ability to service the throttling discs 96 may be particularly useful in several circumstances. For example, where there it is desirable to change in the desired drop in pressure and/or flowrate, the throttling discs 96 may be accessed so that one or more of the throttling discs 96 may be replaced, exchanged, and rearranged. An example may include an oil and gas application where the formation pressure has dropped over a given period and there is no longer a need for a large amount of throttling. The throttling discs 96 may be removed and rearranged and or replaced to reduce the amount of throttling. Further, accessing the throttling discs 96 may be useful for inspection, service, and repair of the throttling discs 96. For example, the throttling discs 96 may be removed to inspect the one or more of the throttling discs 96 for wear or failure. Where a failure has occurred (e.g., cracking of the throttling disc), the failed throttling disc 96 can be removed and replaced. In accordance with the previously discussed embodiments, the ductile retaining throttling disc 108 may contribute to the ease of servicing via the lateral passage 54 by retaining portions of failed throttling discs 96 so that they may be readily accessed and removed via the lateral passage 54.

Although the above discussion includes the throttling section 26 located downstream (e.g., in the direction of the arrow 60 from the inlet 28 to the outlet 30) from the gate 16, the throttling section 26 may be disposed upstream from the gate 16. In one embodiment, the throttling section 26 is disposed partially in the first passage portion 48 and partially in the lateral passage portion 52 proximate the first gate face 86. In such an embodiment, the first seat ring 18 may include features previously discussed with regard to the second seat ring 20. For example, the first seat ring 18 may include a generally L shape having a lip to retain the throttling discs 96. Further, the first seat ring 18 may or may not include a throttling portion 116. In such an embodiment, the retaining throttling disc 108 continues to be disposed downstream of the first throttling discs 106. However, the retaining throttling disc 108 may be disposed such that it is held in place via the first seat ring 18.

Further, the above discussion considers flow that generally occurs from the inlet 28 to the outlet 30 in the direction of the arrow 60. However, in certain embodiments, the flow may be reversed and/or bidirectional. For example, in any of the above discussed embodiments, the fluid may include a flow path from the outlet 30 to the inlet 28. In an embodiment that includes bi-directional flow, it may be advantageous to provide varying arrangements of the throttling discs 96. For example, instead of having the retaining throttling disc 108 located on a single end of the throttling section 26 (e.g., the throttling outlet 102), the throttling section 26 may include the retaining throttling disc 108 at one or both ends of the throttling section (e.g., the throttling inlet 100 and the throttling outlet 102).

Figure 6:
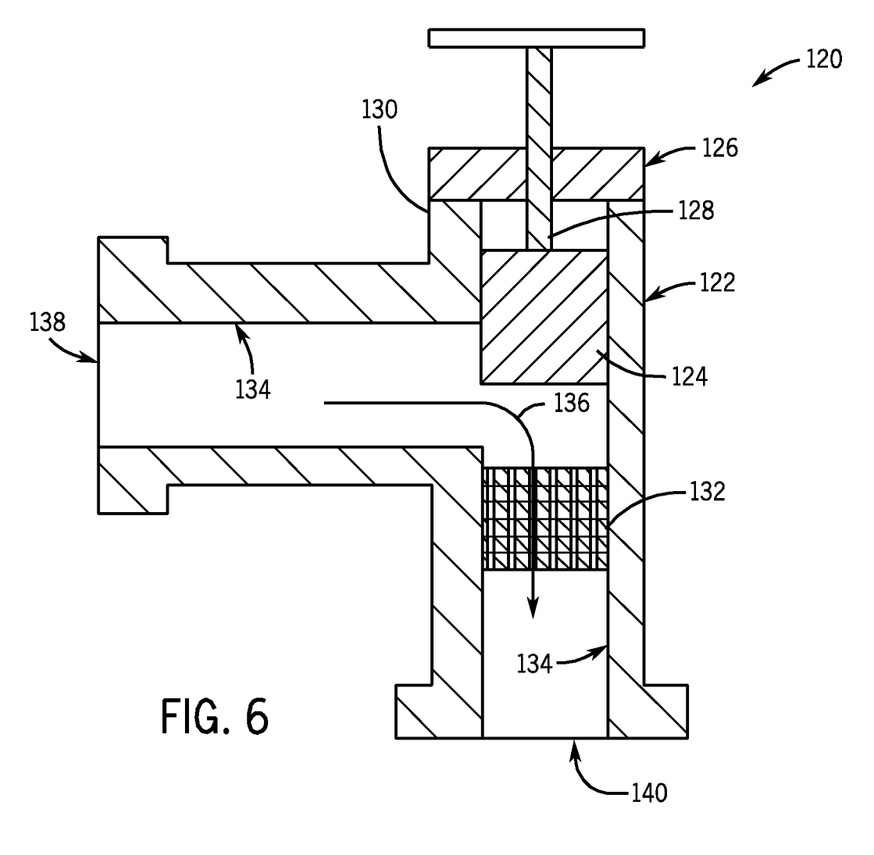
FIG. 6 is a cross-sectioned side view of an alternate embodiment of the valve.

Turning now to FIG. 6, an embodiment including a control valve 120 (e.g., choke valve) having features of the previously discussed embodiments, is illustrated. The choke valve 120 includes a body 122, a gate 124, a control 126, a stem 128, a bonnet 130, and a throttling section 132. The body 122 of the choke valve 120 includes a primary passage 134 that has a right-angled flow path 136 extending from an inlet 138 to an outlet 140. In the illustrated embodiment, the choke valve 120 includes the throttling section 132 disposed downstream of the gate 124.

The throttling section 132 may include features similar to those discussed previously with regard to FIGS. 1-5. For example, the throttling sections 132 may include one or more interchangeable throttling discs that include a plurality of ports to provide a desired throttling effect. Further, the throttling discs may be formed from the same or different materials. For example, the throttling discs may include a retaining throttling disc that is formed from a relatively ductile material. As will be appreciated, other modifications may be made to the choke valve 120 to enable each of the above discussed features to be employed 120. For example, the throttling sections 132 may further include an additional retaining ring or throttling discs that provides a similar retention function as the first seat ring 18 and second seat ring 20 provided in the previously discussed embodiments.

In one embodiment, the choke valve 120 may include an alternate form of fluid restriction. For example, in the illustrated embodiment, the gate 124 may include a gate disc disposed proximate the discs of the throttling section 132. For example, in one embodiment, the gate disc (e.g., upstream disc of the throttling section 132) may include one or more holes that align with one or more ports of the throttling section 132. The gate disc is rotated between a first position (e.g., open position) that at least partially aligns the holes of the gate disc with the ports of the throttling section 132, thereby enabling fluid flow through the throttling section 132, and a second position (e.g., closed position) that includes partially or completely offsetting the holes in the gate disc from the ports of the throttling section 132, thereby occluding flow through the throttling section 132. In another embodiment, the gate 124 includes two gate discs that include complementary holes. The two gate discs are rotated relative to one another to align the holes (e.g., an open gate position) or to offset the holes (e.g., a closed gate position). In the previously discussed embodiments, rotation of the gate discs may be provided by the control 126 and/or or the stem 128. For example, in one embodiment, the stem 128 is coupled to at least one of the gate disc, and rotation of the control 126 and the stem 128 provides rotation of the gate disc relative to the ports of throttling section 132 and/or the second gate disc.

Figure 7:
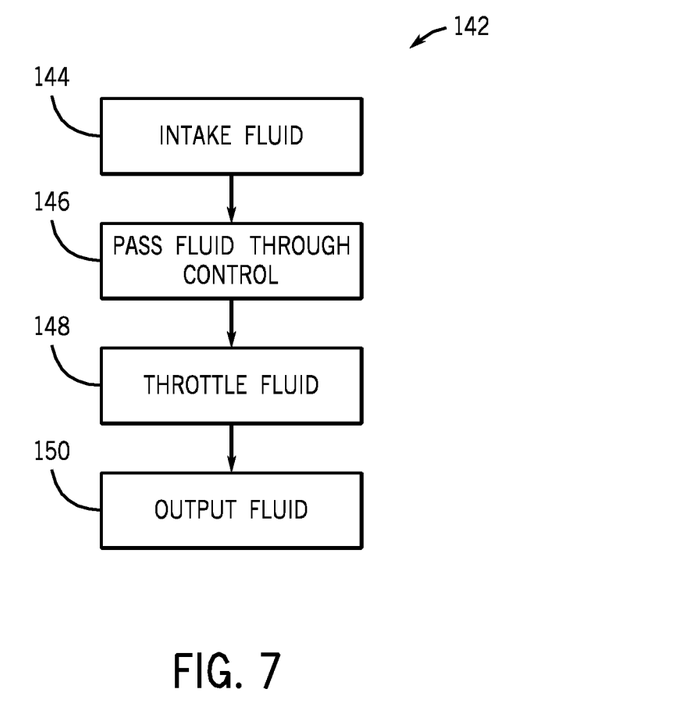
FIG. 7 is a flowchart that illustrates a method in accordance with one or more embodiments of the present technique.

FIG. 7 is a block diagram that illustrates a method 142 of throttling employing the previously discussed techniques. The method 142 includes intaking the fluid, as illustrated at block 144. Intaking the fluid includes providing a connection to a fluid source and intaking fluid to the primary passage 44 of the valve 12 via the first passage portion 48, in one embodiment. For example, intaking the fluid may include the flow of oil and gas from a pipe coupled to an oil and gas formation via an oil and gas well. In another embodiment, intaking the fluid may include piping a fluid from a manufacturing facility, a refinery, a water treatment facility, an industrial plant, and the like.

The method 142 also includes passing the fluid through a control, as illustrated at block 146. Passing fluid through a control includes passing the fluid through the gate 16, in one embodiment. In another embodiment, such as an embodiment including the choke valve 120, passing the fluid through the control includes passing the fluid proximate the gate 124. As discussed previously, the gate may include manual control (e.g., rotation of the wheel 78) or automated control (e.g., operation of an actuator) to regulate the position of the gate 16 and 124 and, thus, regulate the fluid passing through the control.

The method 142 includes throttling the fluid section, as illustrated at block 148. Throttling the fluid may include passing the fluid through one or more of the plurality of throttling sections 26 and 132, in one embodiment. In another embodiment, throttling the fluid may include passing the fluid through the throttling section 26 and 132 downstream of the control (e.g., gate 16 and 124), or upstream of the control, wherein the throttling section 26 includes interchangeable throttling discs 26 that include the first throttling discs 106 and the ductile retaining disc 108. Accordingly, the steps of passing the fluid through the control (block 146) and throttling the fluid (block 148) can be reversed in order.

Finally, the method 142 includes outputting the fluid, as illustrated at block 150. Outputting the fluid may include providing a connection to desired output path and expelling the fluid from the valve 12 and 120. For example, one embodiment includes expelling the fluid from the primary passage 44 and 134 of the valve 12 and 120 into a pipe or other conduit coupled to the outlet 30 and 140. For example, the outlet 30 and 140 may include a pipe that directs the fluid to subsequent processing, a storage facility, a manufacturing facility, a refinery, a water treatment facility, an industrial plant, and the like. If flow is reversed or bidirectional, each of the features of the valve 12 and 120 may be employed to provide the desired fluid flow.

Figure 8:
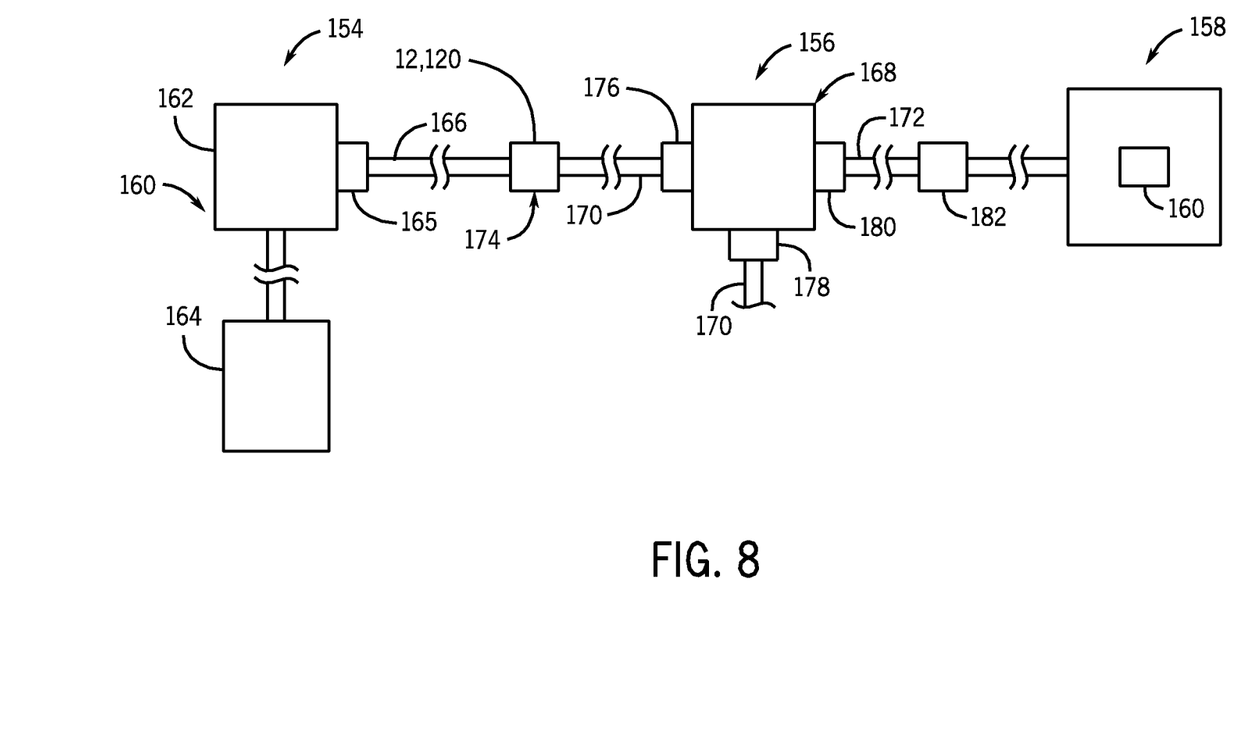
FIG. 8 is a block diagram of a system including the valve of FIGS. 1-6 in accordance with one or more embodiments of the present technique.

Valves 12 and 120 may be employed in a variety of applications and industries. As mentioned previously, valves 12 and 120 can be used to regulate, direct, and throttle fluid flow in oil and gas systems, storage facilities, manufacturing facilities, refineries, water treatment facilities, industrial plants, and the like. FIG. 8 illustrates various implementations of the valve 12 and 120 in a system (e.g., oil and gas system) 152. In the illustrated embodiment, the system 152 includes an extraction system 154, a transport system 156, and a processing system 158. The extraction system 154 includes a pressure control system 160 including a pressure control (e.g., a christmas tree) 162 in fluid communication with a fluid/gas source (e.g., a mineral deposit) 164. Further, the pressure control 162 includes a first valve 165 disposed between the fluid/gas source 164 and an output 166 of the extraction system 154. In one embodiment, the first valve 165 may be integral to the pressure control 162, or may include a component separate from the pressure control 162.

The transport system 156 includes a routing system (e.g., a manifold) 168 that includes a plurality of inputs 170 that are routed to at least one output 172. For example, the routing system 168 includes a first input 174 routed from the output 166 of the extraction system 154 The input 174 includes a valve 12 or 120 disposed in the fluid path between the output 166 and the routing system 168. The input 174 also includes a second valve 176 proximate the routing system 168. The second valve 176 may be integral to the routing system 168 in one embodiment. In addition, the routing system 168 includes a third valve 178 that is disposed in-line with another of the fluid inputs 170. Further, the routing system 168 includes a fourth valve 180 in-line with the output 172.

The output 172 of the routing system 168 is in fluid communication with the processing system 158 via a connection that includes an in-line valve 182. The processing system 158 may include an oil and gas storage facility, a refinery, and the like. In the illustrated embodiment, the processing system 158 includes one or more of valves 160. For example, where the processing system 158 includes a storage facility or a refinery, a plurality of valves 160 may be used to throttle the fluid flow. Although the illustrated system 152 is discussed with regard to one configuration of a system, one or more valves may be employed in any number of systems that desire a valve assembly that provides for pressure and flow regulation, exhibits increased durability and life expectancy, and that allows for easier, faster, and cheaper maintenance.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve, comprising:
   a flow passage;
   a movable valve member disposed in the flow passage, wherein the moveable valve member is configured to adjust a fluid flow through the flow passage;
   a multi-stage throttling section disposed in the flow passage, wherein the movable valve member and the multi-stage throttling section are disposed one after another in a flow direction along the flow passage, the multi-stage throttling section comprises a first throttling component and a second throttling component disposed one after another in the flow direction, the first throttling component comprises a first material that is resistant to wear, the second throttling component comprises a second material that is resistant to cracking, and the second throttling component is configured to catch at least a portion of the first throttling component in the event of failure of the first throttling component;
   wherein the first throttling component comprises a first throttling disc with a first plurality of openings, second throttling component comprises a second throttling disc with a second plurality of openings, and the first and second plurality of openings are misaligned with one another; and
   wherein the second plurality of openings comprises larger openings than the first plurality of openings, and the second throttling disc has a greater thickness than the first throttling disc.

2. The valve of claim 1, wherein the multi-stage throttling section comprises a plurality of throttling components that are interchangeable with one another, and the plurality of throttling components comprises the first and second throttling components.

3. The valve of claim 2, wherein the plurality of throttling components comprises a plurality of throttling discs arranged in a stack one after another in the flow direction.

4. The valve of claim 1, wherein the multi-stage throttling section is accessible via a lateral passage of the valve.

5. The valve of claim 1, comprising a seat ring having an end portion and a side wall portion extending around the end portion, wherein the second throttling disc is disposed downstream from the first throttling disc, and the side wall portion extends around a plurality of throttling discs including at least the first throttling disc, wherein the movable valve member is disposed entirely upstream from the multi-stage throttling section.

6. The valve of claim 5, wherein the movable valve member comprises a slab gate with a sealing insert configured to seal a surface of the slab gate with a mating surface of the multi-stage throttling section.

7. The valve of claim 1, wherein the movable valve member is disposable in any position between a fully open and a fully closed position.

8. The valve of claim 7, wherein the movable valve member comprises a sealing face that is not exposed to direct fluid flow through the flow passage in the fully open position.

9. The valve of claim 8, wherein the movable valve member comprises a linear slab gate, the linear slab gate is reversible, and the linear slab gate comprises a sealing insert made of a hard material.

10. The valve of claim 1, wherein the valve is configured for bi-directional flow though the flow passage, and the first and second throttling components are configured to be rearranged to position the first throttling component upstream of the second throttling component for each flow direction of the bi-directional flow.

11. The valve of claim 1, wherein the movable valve member comprises a reversible slab gate, wherein the reversible slab gate comprises a first sealing insert comprising a first hard material and a second sealing insert comprising a second hard material, the first sealing insert is disposed in a first groove on a first side of the reversible slab gate, and the second sealing insert is disposed in a second groove on a second side of the reversible slab gate.

12. The valve of claim 1, wherein the multi-stage throttling section is disposed downstream of the movable valve member.

13. The valve of claim 1, wherein the multi-stage throttling section is disposed upstream of the movable valve member.

14. The valve of claim 1, wherein the flow passage comprises a right-angled flow passage that turns approximately 90 degrees between an inlet and an outlet.

15. The valve of claim 1, wherein the flow passage comprises an in-line flow passage having a longitudinal axis that extends straight between an inlet and an outlet.

16. A valve system, comprising:
   a valve, comprising:
      a flow passage;
      a slab gate disposed in the flow passage, wherein the slab gate is configured to adjust a fluid flow through the flow passage;
      a first multi-stage throttling section disposed in the flow passage on a first side of the slab gate, wherein the multi-stage throttling section comprises a plurality of throttling plates arranged in a stack one after another in a flow direction through the flow passage, a first plate in the stack comprises a first material that is resistant to wear, a second plate in the stack comprises a second material that is resistant to cracking, the second plate is configured to catch at least a portion of the first plate in the event of failure of the first plate;
      a first sealing insert configured to seal a first surface of the slab gate with a mating surface of the first multi-stage throttling section, wherein the first sealing insert is separate from the slab gate and the multi-stage throttling section, and the first sealing insert is configured to block direct exposure of the first surface to the fluid flow while the slab gate is disposed in an open position; and
   wherein the second plate comprises a plurality of second openings that are larger than a plurality of first openings in the first plate, and the second plate has a greater thickness than the first plate.

17. The valve system of claim 16, comprising a second multi-stage throttling section separate from the first multi-stage throttling section, wherein the second multi-stage throttling section is disposed on a second side of the slab gate.

18. The valve system of claim 16, wherein the valve comprises a lateral passage intersecting the flow passage, and the slab gate and the first multi-stage throttling section are both accessible through the lateral passage.

19. The valve system of claim 16, wherein the slab gate is a reversible slab gate having the first sealing insert and a second sealing insert, the first sealing insert is disposed in a first groove on a first side of the reversible slab gate, and the second sealing insert is disposed in a second groove on a second side of the reversible slab gate.

20. The valve system of claim 16, wherein each plate of the plurality of throttling plates comprises a plurality of openings, and the plurality of openings are misaligned with one another from one plate to another.

21. The valve system of claim 16, wherein the plurality of throttling plates are interchangeable with one another.

22. The valve system of claim 16, wherein the valve comprises a first seat ring having an end portion and a side wall portion, a face of the first plate abuts the end portion, and an outer perimeter of the first plate is surrounded by the side wall portion.

23. A fluid system, comprising:
   a valve, comprising:
      a flow passage
      a lateral passage that intersects the flow passage;
      a slab gate disposed along the flow passage; and
      a multi-stage throttling section; disposed along the flow passage on one side of the slab gate, wherein the slab gate and the multi-stage throttling section are both accessible via the lateral passage, and the multi-stage throttling section comprises:
      a first throttling disc comprising a first plurality of openings;
      a second throttling disc comprising a second plurality of openings, wherein the first throttling disc comprises a first material that is resistant to wear, the second throttling disc comprises a second material that is resistant to cracking, and the second throttling disc is configured to catch at least a portion of the first throttling disc in the event of failure of the first throttling disc;
      a seat ring extending around a perimeter of the first throttling disc, wherein the seat ring extends at least partially into the lateral passage; and
   wherein the second plurality of openings comprises larger openings than the first plurality of openings, and the second throttling disc has a greater thickness than the first throttling disc.

24. The fluid system of claim 23, wherein the fluid system comprises a mineral system.

25. The fluid system of claim 23, wherein the multi-stage throttling section is configured to reduce erosion downstream of the multi-stage throttling section.

\* \* \* \* \*